(12) United States Patent
Colavolpe et al.

(10) Patent No.: US 7,444,082 B2
(45) Date of Patent: Oct. 28, 2008

(54) POLARISATION MODE DISPERSION COMPENSATOR USING A MEAN SQUARE ERROR TECHNIQUE

(75) Inventors: Giulio Colavolpe, Parma (IT); Enrico Forestieri, Parma (IT); Giancarlo Prati, Parma (IT)

(73) Assignee: Ericsson AB, Stockholm (SE)

( * ) Notice: Subject to any disclaimer, the term of this patent is extended or adjusted under 35 U.S.C. 154(b) by 514 days.

(21) Appl. No.: 10/498,616

(22) PCT Filed: Dec. 3, 2002

(86) PCT No.: PCT/IB02/05661

§ 371 (c)(1),
(2), (4) Date: Feb. 15, 2005

(87) PCT Pub. No.: WO03/050985

PCT Pub. Date: Jun. 19, 2003

(65) Prior Publication Data

US 2005/0129409 A1 Jun. 16, 2005

(30) Foreign Application Priority Data

Dec. 13, 2001 (IT) .......................... MI2001A2631

(51) Int. Cl.
*H04B 10/00* (2006.01)
(52) U.S. Cl. .................. 398/152; 398/152; 398/158; 398/148; 398/147; 398/159
(58) Field of Classification Search ............... 398/152, 398/205, 148, 158, 147, 159
See application file for complete search history.

(56) References Cited

U.S. PATENT DOCUMENTS 6,115,419 A 9/2000 Meehan (Continued)

FOREIGN PATENT DOCUMENTS

EP 0 725 477 A2 8/1996

OTHER PUBLICATIONS

*Automatic Polarisation Mode Dispersion Compensation in 40 GBit/s Optical Transmission System Electronics Letters*, IEE Stevenage, BG, D, Sandel, et al., vol. 34, No. 23, Nov. 12, 1998, pp. 2258-2259.
*Adaptive PMD Mitigation at 10 GBits/s Using an Electronic Sige Equaliser IC*, 25th European Conference on Optical Communication, (ECOC'99) Nice, France, H. Buelow, et al., Sep. 27-30, 1999, Regular and Invited Papers, European Conference on Optical Communication (ECOC), Paris, FR, vol. II or II, Sep. 26, 1999, pp. II-138-II-139.

*Primary Examiner*—Kenneth Vanderpuye
*Assistant Examiner*—Hibret A Woldekidan
(74) *Attorney, Agent, or Firm*—Kirschstein, et al.

(57) ABSTRACT

A method for the adaptive adjustment of a PMD compensator in optical fiber communication systems comprises the steps of taking the signal at the compensator output and extracting the components $y_1(t)$ and $y_2(t)$ on the two orthogonal polarizations, computing the signal $y(t)=[y_1(t)]^2+[y_2(t)]^2$, sampling the signal $y(t)$ at instants $t_k=kT$ with T=symbol interval to obtain samples $y(t_k)$, computing the mean square error $e(k)=y(t_k)-u(k)$ with $u(k)$ equal to the symbol transmitted, and adjusting the parameters of the compensator to seek to minimize $e(k)$. A PMD compensator in accordance with the method comprises an adjustment system which comprises in turn a photodetecor (17) which takes the components $y_1(t)$ and $y_2(t)$ on the two orthogonal polarizations from the signal at the compensator output, a sampler (19) which samples at instants $t_k=kT$ with T=symbol interval, the signal $y(t)=[y^1(t)]^2+[y_2(t)]^2$ at the output of the photodetector (17) to obtain samples $y(t_k)$, a circuit (18, 20) for computation of the mean square error $e(k)=y(t_k)-u(k)$ with $u(k)$ equal to the symbol transmitted, and a regulator (15, 16) which regulates the parameters of the compensator to seek to minimize $e(k)$.

12 Claims, 2 Drawing Sheets

U.S. PATENT DOCUMENTS 6,728,491 B1 * 4/2004 Ooi et al. .................... 398/147
6,768,875 B1 * 7/2004 Eiselt et al. ................. 398/147
6,782,211 B1 * 8/2004 Core .......................... 398/205

* cited by examiner

US 7,444,082 B2

POLARISATION MODE DISPERSION COMPENSATOR USING A MEAN SQUARE ERROR TECHNIQUE

BACKGROUND OF THE INVENTION

The present invention relates to methods of adaptive adjustment of PMD compensators in optical fiber communication systems. The present invention also relates to a compensator in accordance with said method.

In optical fiber telecommunications equipment the need to compensate the effects of polarization mode dispersion (PMD) which occur when an optical signal travels in an optical fiber based connection is known.

It is known that PMD causes distortion and dispersion of optical signals sent over optical fiber connections malting the signals distorted and dispersed. The different time delays among the various signal components in the various polarization states acquire increasing importance with the increase in transmission speeds. In modern optical fiber based transmission systems with ever higher frequencies (10 Gbit/s and more), accurate compensation of PMD effects becomes very important and delicate. This compensation must be dynamic and performed at adequate speed.

SUMMARY OF THE INVENTION

The general purpose of the present invention is to remedy the above mentioned shortcomings by making available a method of fast, accurate adaptive adjustment of a PMD compensator and a compensator in accordance with said method.

In view of this purpose it was sought to provide in accordance with the present invention a method for the adaptive adjustment of a PMD compensator in optical fiber communication systems with the compensator comprising a cascade of adjustable optical devices over which passes an optical signal to be compensated comprising the steps of extracting the y1(t) and y2(t) on the two orthogonal polarizations of the signal at the compensator output, obtaining the signal $y(t)=|y_1(t)|^2+|y_2(t)|^2$, sampling the signal y(t) at instants $t_k=kT$ with T=symbol interval to obtain samples $y(t_k)$, computing the mean square error $e(k)=y(t_k)-u(k)$ with u(k) equal to the symbol transmitted or with u(k) replaced by a decision û(k) on the transmitted symbol u(k), and producing control signals for parameters of at least some of said adjustable optical devices to tend toward minimization of e(k).

In accordance with the method it was also sought to realize a PMD compensator in optical fiber communication systems applying the method and comprising a cascade of adjustable optical devices over which passes an optical signal to be compensated and an adjustment system comprising a photodetector (17) which takes the components $y_1(t)$ and $y_2(t)$ on the two orthogonal polarizations from the signal at the compensator output, a sampler 19 which samples at instants $t_k=kT$ with T=symbol interval, the signal $y(t)=|y_1(t)|^2+|y_2(t)|^2$ at the output of the photodetector 17 to obtain samples $y(t_k)$, a circuit 18, 20 for computation of the mean square error $e(k)=y(t_k)-u(k)$ with u(k) equal to the symbol transmitted and a regulator 15, 16 which regulates parameters of at least some of said optical devices to tend towards minimization of e(k).

To clarify the explanation of the innovative principles of the present invention and its advantages compared with the prior art there is described below with the aid of the annexed drawings a possible embodiment thereof by way of non-limiting example applying said principles. In the drawings

DETAILED DESCRIPTION OF THE PREFERRED EMBODIMENTS

Figure 1:
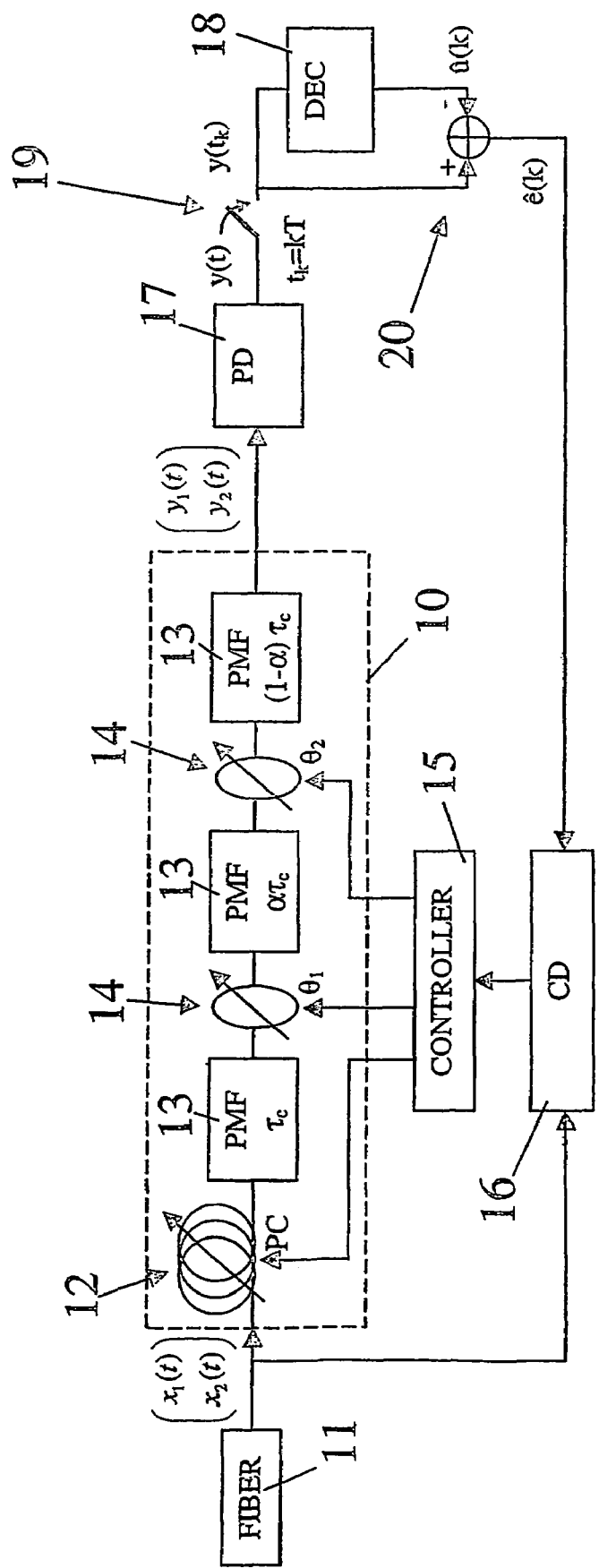
FIG. 1 shows a block diagram of a PMD compensator with associated control circuit.

With reference to the FIGS FIG. 1 shows the structure of a PMD compensator designated as a whole by reference number 10. This structure consists of the cascade of some optical devices which receive the signal from the transmission fiber 11. The first optical device is a polarization controller 12 (PC) which allows modification of the optical signal polarization at its input. Thus there are three polarization maintaining fibers 13 (PMF) separated by two optical rotators 14.

A PMF fiber is a fiber which introduces a predetermined differential group delay (DGD) between the components of the optical signal on its two principal states of polarization (PSP) termed slow PSP and fast PSP.

In the case of the compensator shown in FIG. 1 the DGD delays at the frequency of the optical carrier introduced by the three PMFs are respectively $\tau_c$, $\alpha\tau_c$ and $(1-\alpha)\tau_c$, with $0<\alpha<1$ and with $\tau_c$ and $\alpha$ which are design parameters.

An optical rotator is a device which can change the polarization of the optical signal upon its input by an angle $\theta_i$ (the figure shows $\theta_1$ for the first rotator and $\theta_2$ for the second) on a maximum circle on the Poincaré sphere.

An optical rotator is implemented in practice by means of a properly controlled PC.

In FIG. 1, $x_1(t)$ and $x_2(t)$ designate the components on the two PSPs of the optical signal at the compensator input whereas similarly $y_1(t)$ and $y_2(t)$ are the components of the optical signal at the compensator output.

The components $y_1(t)$ and $y_2(t)$ on the two orthogonal polarisations are sent to the input of the photo detector (PD) which produces a signal y(t) given by:

$$y(t)=|y_1(t)|^2+|y_2(t)|^2 \tag{1}$$

This signal can if necessary be filtered by a post-detection filter. Without loss of generality let us assume that this filter is not present. If present this filter produces obvious changes in the adaptive adjustment of the compensator parameters. These changes are readily imaginable to those skilled in the art and are therefore not further described.

As shown again in FIG. 1 the signal y(t) is then sampled by a sampler 19 at the instants $t_k=kT$, where T is the symbol interval. Based on the sample $y(t_k)$ a decision on the transmitted bit u(k) is made. Let us designate here by û(k) this decision made by a known decider circuit 18 (DEC).

The input-output behavior of each of the optical devices is described here by means of the so-called Jones transfer matrix H(w) which is a 2×2 matrix characterized by frequency-dependent components. Denoting by $W_1(\omega)$ and $W_2(\omega)$ the Fourier transforms of the components of the optical signal at the device input the Fourier transforms $Z_1(\omega)$ and $Z_2(\omega)$ of the components of the optical signal at the device output are given by:

$$\begin{pmatrix} Z_1(\omega) \\ Z_2(\omega) \end{pmatrix} = H(\omega) \begin{pmatrix} W_1(\omega) \\ W_2(\omega) \end{pmatrix} \tag{2}$$

Thus the Jones transfer matrix of the PC is $$\begin{pmatrix} h_1 & h_2 \\ -h_2^* & h_1^* \end{pmatrix} \quad (3)$$

where $h_1$ e $h_2$ satisfy the condition $|h_1|^2+|h_2|^2=1$ and are frequency independent.

Denoting by $\phi_1$ and $\phi_2$ the PC control angles, $h_1$ and $h_2$ are expressed by:

$$h_1 = -\cos(\phi_2-\phi_1)+j\sin(\phi_2-\phi_1)\sin\phi_1$$

$$h_2 = -j\sin(\phi_2-\phi_1)\cos\phi_1 \quad (4)$$

Clearly if the PC is controlled using other angles or voltages, different relationships will correlate these other parameters with $h_1$ and $h_2$. The straightforward changes in the algorithms for adaptive adjustment of the PMD compensator are discussed below.

Similarly, an optical rotator with rotation angle $\theta_i$ is characterized by the following Jones matrix:

$$\begin{pmatrix} \cos\theta_i & \sin\theta_i \\ -\sin\theta_i & \cos\theta_i \end{pmatrix} \quad (5)$$

The Jones transfer matrix of a PMF with DGD $\tau_i$ may be expressed as $RDR^{-1}$ where D is defined as:

$$D \triangleq \begin{pmatrix} e^{j\omega\tau_i/2} & 0 \\ 0 & e^{-j\omega\tau_i/2} \end{pmatrix} \quad (6)$$

and R is a unitary rotation matrix accounting for the PSPs' orientation. This matrix R may be taken as the identity matrix I without loss of generality when the PSPs of all the PMPs are aligned.

As shown in FIG. 1, to control the PMD compensator a controller 15 is needed to produce optical device control signals of the compensator calculated on the basis of the quantities sent to it by a controller pilot 16 termed controller driver (CD).

The CD feeds the controller with the quantities needed to update the compensator optical device control parameters. As described below, these quantities will be extracted by the CD from the signals at the input and/or output of the compensator.

The controller will operate following the criterion described below and will use one of the two algorithms described below.

To illustrate the PMD compensator adaptive adjustment algorithms let us assume that the controller can directly control the parameters $\phi_1, \phi_2, \theta_1$ and $\theta_2$ which we consolidate in a vector $\theta$ defined as:

$$\theta \triangleq (\phi_1, \phi_2, \theta_1, \theta_2)^T$$

If it is not so, in general there will be other parameters to control, for example some voltages, which will be linked to the previous ones in known relationships. The simple changes necessary are discussed below.

The PMD being a slowly changing phenomenon adjustment of the compensator parameters will be performed at a rate lower then the transmitted symbol rate 1/T. Let us assume that this adjustment is performed at the discrete-time instants $t_n L = nLT$ where $L \geq 1$. We designate by:

$$\theta(nL) = (\phi_1(nL), \phi_2(nL), \theta_1(nL), \theta_2(nL))^T$$

the value of the compensator parameters after the nth update.

In accordance with the method of the present invention the compensator parameter adjusting criterion uses the mean square error (MSE) criterion.

Based thereon, the compensator parameters $\theta$ are adjusted to minimize the mean square error e(k) defined as:

$$e(k) = y(t_k) - u(k) \quad (7)$$

This error is a function of $\theta$ through $y(t_k)$. We explicit this dependence by defining $F(\theta) = e(k)$. Therefore, the performance index to be minimized is the mean value of $F^2(\theta)$. The compensator parameters $\theta$ will be updated by the rule:

$$\phi_1[(n+1)L] = \phi_1(nL) - \gamma \frac{\partial E\{F^2(\theta)\}}{\partial \phi_1}\bigg|_{\theta=\theta(nL)} \quad (8)$$

$$= \phi_1(nL) - 2\gamma F(\theta) \frac{\partial E\{F(\theta)\}}{\partial \phi_1}\bigg|_{\theta=\theta(nL)}$$

$$= \phi_1(nL) - 2\gamma[y(t_{nL}) - u(nL)] \frac{\partial E\{y(t_{nL})\}}{\partial \phi_1}$$

$$\phi_2[(n+1)L] = \phi_2(nL) - \gamma \frac{\partial E\{F^2(\theta)\}}{\partial \phi_2}\bigg|_{\theta=\theta(nL)}$$

$$= \phi_2(nL) - 2\gamma F(\theta) \frac{\partial E\{F(\theta)\}}{\partial \phi_2}\bigg|_{\theta=\theta(nL)}$$

$$= \phi_2(nL) - 2\gamma[y(t_{nL}) - u(nL)] \frac{\partial E\{y(t_{nL})\}}{\partial \phi_2}$$

$$\theta_1[(n+1)L] = \theta_1(nL) - \gamma \frac{\partial E\{F^2(\theta)\}}{\partial \theta_1}\bigg|_{\theta=\theta(nL)}$$

$$= \theta_1(nL) - 2\gamma F(\theta) \frac{\partial E\{F(\theta)\}}{\partial \theta_1}\bigg|_{\theta=\theta(nL)}$$

$$= \theta_1(nL) - 2\gamma[y(t_{nL}) - u(nL)] \frac{\partial E\{y(t_{nL})\}}{\partial \theta_1}$$

$$\theta_2[(n+1)L] = \theta_2(nL) - \gamma \frac{\partial E\{F^2(\theta)\}}{\partial \theta_2}\bigg|_{\theta=\theta(nL)}$$

$$= \theta_2(nL) - 2\gamma F(\theta) \frac{\partial E\{F(\theta)\}}{\partial \theta_2}\bigg|_{\theta=\theta(nL)}$$

$$= \theta_2(nL) - 2\gamma[y(t_{nL}) - u(nL)] \frac{\partial E\{y(t_{nL})\}}{\partial \theta_2}$$

where $E\{.\}$ denotes "expected" and $\gamma>0$ is a scale factor which controls the adjustment amount.

In vector notation this means that the vector of the compensator parameters is updated by adding a new vector with its norm proportional to the norm of the gradient $F^2(\theta)$ and with opposite direction, i.e. all its components have their sign changed:

$$\theta[(n+1)L] = \theta(nL) - \gamma \nabla E\{F^2(\theta)\}|_{\theta=\theta(nL)} = \theta(nL) - 2\gamma F(\theta)$$
$$\nabla E\{F(\theta)\}|_{\theta=\theta(nL)} \quad (9)$$

This way we are sure to move towards a relative minimum of the function $F^2(\theta)$. Three variations of the basic updating method defined in (8) can be obtained by using only sign information contained in the error e(k) and/or the partial derivative. Hence the three possible variations are (considering for example the updating rule related to $\varphi_1$):

$$\varphi_1[(n+1)L] = \varphi_1(nL) \; 2\gamma \mathrm{sign}[y(t_{nL}) \; u(nL)] \frac{\partial E\{y(t_{nL})\}}{\partial \varphi_1} \quad (10)$$

or $$\varphi_1[(n+1)L] = \varphi_1(nL) \; 2\gamma [y(t_{nL}) \; u(nL)] \mathrm{sign} \frac{\partial E\{y(t_{nL})\}}{\partial \varphi_1} \quad (11)$$

or $$\varphi_1[(n+1)L] = \varphi_1(nL) \; 2\gamma \mathrm{sign}[y(t_{nL}) \; u(nL)] \mathrm{sign} \frac{\partial E\{y(t_{nL})\}}{\partial \varphi_1} \quad (12)$$

We shall now describe two methods of computing the gradient of the function $F^2(\theta)$ to find the required control parameters.

First Method

Let us consider the updating rule in vector notation (9). To simplify this rule, in the error $F(\theta)=e(k)$ we substitute the transmitted information symbol $u(nL)$ with the corresponding decision $\hat{u}(nL)$, i.e. we substitute the error $e(k)$ with the estimated error $\hat{e}(k)$ defined as:

$$\hat{e}(k) = y(t_k) - \hat{u}(k) \quad (13)$$

In the diagram of FIG. 1 this estimated error is obtained at the output of the subtractor block 20 and sent to the CD. Defining $G[\theta(nL)] = E\{\hat{e}^2(nL)\}$, the updating rule (9) becomes:

$$\theta[(n+1)L] = \theta(nL) - \gamma \nabla G(\theta)|_{\theta=\theta(nL)} \quad (14)$$

The partial derivatives of $G(\theta)$ for $\theta=\theta(t_n)$ can be computed using the following 5-step procedure.

Step 1: Find the value of $G[\theta(nL)] = G[\phi_1(nL), \phi_2(nL), \theta_1(nL), \theta_2(nL)]$ all'iterazione n. at iteration n. To do this, in the time interval (nLT, nLT+LT/5) an estimate of $G[\theta(nL)]$ is computed by averaging the L/5 values of the estimated square error, i.e., $$G[\theta(nL)] = \frac{\sum_{i=0}^{L/5-1} \hat{e}(nL+i)}{L/5} \quad (15)$$

Step 2: find the partial derivative:

$$\left. \frac{\partial G(\theta)}{\partial \phi_1} \right|_{\theta=\theta(nL)}$$

at iteration n. To do this, parameter $\phi_1$ is set at $\phi_1(nL)+\Delta$ while the other parameters are left unchanged. The corresponding value of $G(\theta)$, i.e. $G[\phi_1(nL)+\Delta, \phi_2(nL), \theta_1(nL), \theta_2(nL)]$ is computed as in step 1 but in the time interval (nLT+LT/5, nLT+2LT/5). The estimate of the partial derivative of $G(\theta)$ as a function of $\phi_1$ is computed as:

$$\left. \frac{\partial G(\theta)}{\partial \phi_1} \right|_{\theta=\theta(nL)} \cong \frac{G[\phi_1(nL)+\Delta, \phi_2(nL), \theta_1(nL), \theta_2(nL)] - G[\phi_1(nL), \phi_2(nL), \theta_1(nL), \theta_2(nL)]}{\Delta} \quad (16)$$

Step 3. Find the partial derivative:

$$\left. \frac{\partial G(\theta)}{\partial \phi_2} \right|_{\theta=\theta(nL)}$$

at iteration n. To do this the parameter $\phi_2$ is set at $\phi_2(nL)+\Delta$ while the other parameters are left changed. The corresponding value of $G(\theta)$, i.e. $G[\phi_1(nL), \phi_2(nL)+\Delta, \theta_1(nL), \theta_2(nL)]$, is computed as in step 1 but in the time interval (nLT+2LT/5, nLT+3LT/5). The estimate of the partial derivative of $G(\theta)$ with respect to $\phi_2$ is computed as:

$$\left. \frac{\partial G(\theta)}{\partial \phi_2} \right|_{\theta=\theta(nL)} \cong \frac{G[\phi_1(nL), \phi_2(nL)+\Delta, \theta_1(nL), \theta_2(nL)] - G[\phi_1(nL), \phi_2(nL), \theta_1(nL), \theta_2(nL)]}{\Delta} \quad (17)$$

Step 4: Find the partial derivative:

$$\left. \frac{\partial G(\theta)}{\partial \theta_1} \right|_{\theta=\theta(nL)}$$

at iteration n. To do this, parameter $\theta_1$ is set at $\theta_1(nL)+\Delta$ while the other parameters are left unchanged. The corresponding value of $G(\theta)$, i.e. $G[\phi_1(nL), \phi_2(nL), \theta_1(nL)+\Delta, \theta_2(nL)]$, is computed as in Step 1 but in the time interval (nLT+3LT/5, nLT+4LT/5). The estimate of the partial derivative of $G(\theta)$ with respect to $G(\theta)$ is computed as:

$$\left. \frac{\partial G(\theta)}{\partial \theta_1} \right|_{\theta=\theta(nL)} \cong \frac{G[\phi_1(nL), \phi_2(nL), \theta_1(nL)+\Delta, \theta_2(nL)] - G[\phi_1(nL), \phi_2(nL), \theta_1(nL), \theta_2(nL)]}{\Delta} \quad (18)$$

Step 5: Find the partial derivative:

$$\left. \frac{\partial G(\theta)}{\partial \theta_2} \right|_{\theta=\theta(nL)}$$

at iteration n. To do this the parameter $\theta_2$ is set at $\theta_2(nL)+\Delta$ while the other parameters are left unchanged. The corresponding value of $G(\theta)$, i.e. $G[\phi_1(nL), \phi_2(nL), \theta_1(nL), \theta_2(nL)+\Delta]$, is computed as in Step 1 but in the time interval (nLT+4LT/5, (n+1)LT). The estimate of the partial derivative of $G(\theta)$ with respect to $\theta_2$ is computed as:

$$\left. \frac{\partial G(\theta)}{\partial \phi_2} \right|_{\theta=\theta(nL)} \cong \frac{G[\phi_1(nL), \phi_2(nL), \theta_1(nL), \theta_2(nL)+\Delta] - G[\phi_1(nL), \phi_2(nL), \theta_1(nL), \theta_2(nL)]}{\Delta} \quad (19)$$

The above parameter update is done only after estimation of the gradient has been completed.

Note that in this case it is not necessary that the relationship between the control parameters of PC and optical rotators and the corresponding Jones matrices be known.

Indeed, the partial derivatives of the function with respect to the compensator control parameters are computed without knowledge of this relationship. Consequently if the control parameters are different from those assumed as an example and are for example some voltage or some other angle, we may similarly compute the partial derivative and update these different control parameters accordingly.

Lastly, it is noted that when this algorithm is used the CD is not necessary and the controller must receive the estimated error only.

Second Method

When an accurate characterization of the PC and each optical rotator is available the updating rules may be expressed as a function of the estimated error and the signals on the two orthogonal polarizations at the compensator input.

Using the known stochastic gradient algorithm (for example as mentioned in the book Digital Communications by J. G. Proakis—McGraw-Hill, New York, 1983) and substituting in (8) the error $e(nL)$ with the corresponding estimated error $ê(nL)$ we find:

$$\phi_1[(n+1)L] = \phi_1(nL) - 2\gamma ê(nL)\frac{\partial E\{y(t_{nL})\}}{\partial \phi_1} \quad (20)$$

$$\phi_2[(n+1)L] = \phi_2(nL) - 2\gamma ê(nL)\frac{\partial E\{y(t_{nL})\}}{\partial \phi_2}$$

$$\theta_1[(n+1)L] = \theta_1(nL) - 2\gamma ê(nL)\frac{\partial E\{y(t_{nL})\}}{\partial \theta_1}$$

$$\theta_2[(n+1)L] = \theta_2(nL) - 2\gamma ê(nL)\frac{\partial E\{y(t_{nL})\}}{\partial \theta_2}$$

In vector notation the expression (9) becomes:

$$\theta[(n+1)L] = \theta(nL)\, 2\gamma ê(nL)\nabla y(t_{nL}) \quad (21)$$

Before describing how the gradient of $y(t_nL)$ is to be computed we introduce an equivalent model of the PMD compensator.

Figure 2:
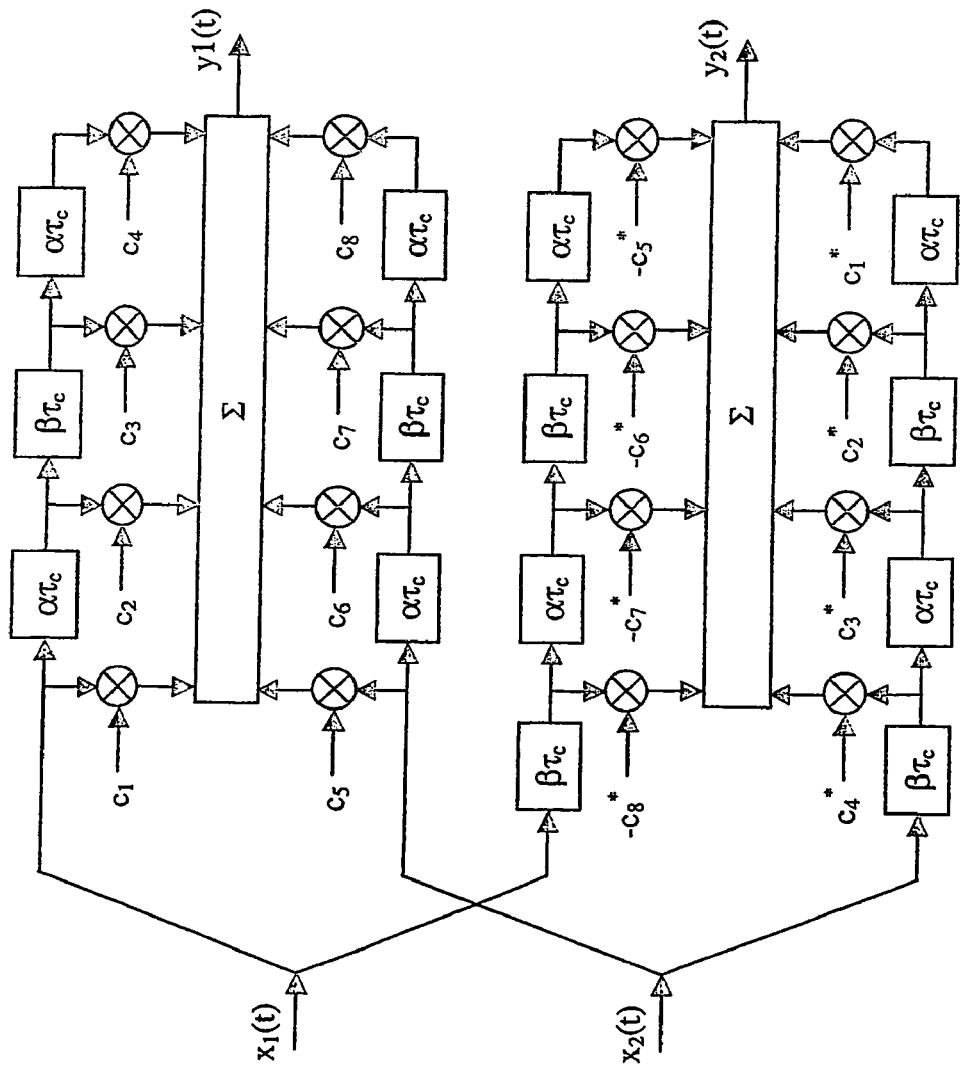
FIG. 2 shows an equivalent model of the PMD compensator.

It was found that the PMD compensator shown in FIG. 1 can be modeled as an equivalent to a two-dimensional transverse filter using four tapped delay lines (TDL) combining the signals on the two principal polarization states (PSP). This equivalent model is shown in FIG. 2 where:

$$c_1 \triangleq \cos\theta_1\cos\theta_2 h_1 \quad (22)$$
$$c_2 \triangleq -\sin\theta_1\sin\theta_2 h_1$$
$$c_3 \triangleq -\sin\theta_1\cos\theta_2 h_2^*$$
$$c_4 \triangleq -\cos\theta_1\sin\theta_2 h_2^*$$
$$c_5 \triangleq \cos\theta_1\cos\theta_2 h_2$$
$$c_6 \triangleq -\sin\theta_1\sin\theta_2 h_2$$
$$c_7 \triangleq \sin\theta_1\cos\theta_2 h_1^*$$
$$c_8 \triangleq \cos\theta_1\sin\theta_2 h_1^*$$

For the sake of convenience let $c(\theta)$ designate the vector whose components are the $c_i$ in (22). It is noted that the tap coefficients $c_i$ of the four TDLs are not independent of each other. On the contrary, given four of them the others are completely determined by (22). In the FIG for the sake of clarity it is designated $\beta=1-\alpha$.

The partial derivatives of $y(t_nL)$ appearing in (21) may be expressed as a function of the components on the two PSPs of the signal at the compensator input at some appropriate instants. The output sample $y(t_k)$ may be written as (where $(B)^H$ indicates the transposed conjugate of the matrix B):

$$y(t_k) = c^H A(k) c \quad (23)$$

where the Hermitian matrix $A(k)$ is given by:

$$A(k) = a(k)^* a^T(k) + b(k)^* b^T(k) \quad (24)$$

with vectors $a(k)$ and $b(k)$ defined by:

$$a(k) = \begin{pmatrix} x_1(t_k) \\ x_1(t_k - \alpha\tau_c) \\ x_1(t_k - \tau_c) \\ x_1(t_k - \tau_c - \alpha\tau_c) \\ x_2(t_k) \\ x_2(t_k - \alpha\tau_c) \\ x_2(t_k - \tau_c) \\ x_2(t_k - \tau_c - \alpha\tau_c) \end{pmatrix} \quad b(k) = \begin{pmatrix} x_2^*(t_k - 2\tau_c) \\ x_2^*(t_k - \tau_c - \beta\tau_c) \\ x_2^*(t_k - \tau_c) \\ x_2^*(t_k - \beta\tau_c) \\ -x_1^*(t_k - 2\tau_c) \\ -x_1^*(t_k - \tau_c - \beta\tau_c) \\ -x_1^*(t_k - \tau_c) \\ -x_1^*(t_k - \beta\tau_c) \end{pmatrix} \quad (25)$$

Computing the gradient of $y(t_nL)$, the algorithm (9) becomes:

$$\theta[(n+1)L] = \theta(nL) - 4\gamma ê(nL)Re\{J^H A(nL)c\} \quad (26)$$

where $$J \triangleq \begin{pmatrix} \frac{\partial c_1}{\partial \phi_1} & \frac{\partial c_1}{\partial \phi_2} & \frac{\partial c_1}{\partial \theta_1} & \frac{\partial c_1}{\partial \theta_2} \\ \frac{\partial c_2}{\partial \phi_1} & \frac{\partial c_2}{\partial \phi_2} & \frac{\partial c_2}{\partial \theta_1} & \frac{\partial c_2}{\partial \theta_2} \\ \vdots & \vdots & \vdots & \vdots \\ \frac{\partial c_8}{\partial \phi_1} & \frac{\partial c_8}{\partial \phi_2} & \frac{\partial c_8}{\partial \theta_1} & \frac{\partial c_8}{\partial \theta_2} \end{pmatrix} \quad (27)$$

is the Jacobean matrix of the transformation $c=c(\theta)$.

When the control parameters are different from those taken as examples we will have different relationships between these control parameters and coefficients $c_i$. For example, if the PC is controlled by means of some voltages, given the relationship between these voltages and the coefficients $h_1$ and $h_2$ which appear in (3) by using the equations (22) we will always be able to express the coefficients ci as a function of these new control parameters.

Consequently in computing the gradient of $y(t_nL)$ the only change we have to allow for is the expression of the Jacobean matrix J, which has to be changed accordingly as readily imaginable to those skilled in the art.

Lastly it is noted that when this second method is used the CD must receive the optical signals at the input of the compensator and the estimated error $ê(nL)$. The CD must supply the controller directly with this estimated error and with the signal samples $x_1(t)$ and $x_2(t)$ at the desired instants.

It is now clear that the predetermined purposes have been achieved by making available an effective method for adaptive control of a PMD compensator and a compensator applying this method.

Naturally the above description of an embodiment applying the innovative principles of the present invention is given by way of non-limiting example of said principles within the scope of the exclusive right claimed here.

The invention claimed is:

1. Method for the adaptive adjustment of a PMD compensator in optical fiber communication systems with the compensator comprising a cascade of adjustable optical devices over which passes an optical signal to be compensated comprising the steps of:
   a. extracting the $y_1(t)$ and $y_2(t)$ on the two orthogonal polarizations of the signal at the compensator output,
   b. obtaining the signal $y(t)=|y_1(t)|^2+|y_2(t)|^2$;
   c. sampling the signal $y(t)$ at instants $t_k=kT$ with $T$=symbol interval to obtain samples $y(t_k)$,
   d. computing the mean square value of the error $e(k)=y(t_k)-u(k)$ with $u(k)$ equal to the symbol transmitted or with $u(k)$ replaced by a decision $\hat{u}(k)$ on the transmitted symbol $u(k)$, and
   e. producing control signals for parameters of at least some of said adjustable optical devices to tend toward minimization of the mean square value of $e(k)$,
   in which said parameters being consolidated in a vector $\theta$ and a function $F(\theta)=e(k)$ being defined the parameters are adjusted to tend to minimize the mean value of $F^2(\theta)$,
   in which the vector $\theta$ of the parameters is updated by adding a new vector with the norm proportionate to the norm of the gradient of $F^2(\theta)$ and with opposite direction, all its components have their sign changed so that the updating rule is:

$$\theta[(n+1)L]=\theta(nL)-\gamma\nabla E\{F^2(\theta)\}|_{\theta=\theta(nL)}=\theta(nL)-2\gamma F(\theta)\nabla E\{F(\theta)\}|_{\theta=\theta(nL)} \quad (9)$$

so that movement is towards a relative minimum of the function $F^2(\theta)$,
   in which in the error $F(\theta)=e(k)$ the transmitted information symbol $u(nL)$ is substituted with the corresponding decision $\hat{u}(nL)$ so as to substitute the error $e(k)$ with the estimated error $\hat{e}(k)$ defined as $\hat{e}(k)=y(t_k)-\hat{u}(k)$,
   in which $G[\theta(nL)]=E\{\hat{e}^2(nL)\}$ is defined so that the updating rule (9) becomes:

$$\theta[(n+1)L]=\theta(nL)-\gamma\nabla G(\theta)|_{\theta=\theta(nL)} \quad (14),$$

and in which the partial derivatives of $G(\theta)$ for $\theta=\theta(t_n)$ are computed by the following five-step procedure:
   Step 1. Find the value of $G[\theta(nL)]=G[\phi_1(nL),\phi_2(nL),\theta_1(nL),\theta_2(nL)]$ at iteration n; to do this, in the time interval $(nLT, nLT+LT/5)$ an estimate of $G[\theta(nL)]$ is computed by averaging the $L/5$ values of the estimated square error, $$G[\theta(nL)]=\frac{\sum_{i=0}^{L/5-1}\hat{e}(nL+i)}{L/5} \quad (15)$$

Step 2. Find the partial derivative:

$$\left.\frac{\partial G(\theta)}{\partial \varphi_1}\right|_{\theta=\theta(nL)}$$

at iteration n; to do this, parameter $\phi_1$ is set at $\phi_1(nL)+\Delta$ while the other parameters are left unchanged; the corresponding value of $G(\theta)$, $G[\phi_1(nL)+\Delta,\phi_2(nL),\theta_1(nL),\theta_2(nL)]$ is computed as in step 1 but in the time interval $(nLT+LT/5, nLT+2LT/5)$; the estimate of the partial derivative of $G(\theta)$ with respect to $\phi_1$ is computed as:

$$\left.\frac{\partial G(\theta)}{\partial \varphi_1}\right|_{\theta=\theta(nL)} \cong \frac{G[\varphi_1(nL),+\Delta, \varphi_2(nL), \theta_1(nL), \theta_2(nL)] - G[\varphi_1(nL), \varphi_2(nL), \theta_1(nL), \theta_2(nL)]}{\Delta} \quad (16)$$

Step 3. Find the partial derivative:

$$\left.\frac{\partial G(\theta)}{\partial \varphi_2}\right|_{\theta=\theta(nL)}$$

at iteration n; to do this the parameter $\phi_2$ is set at $\phi_2(nL)+\Delta$ while the other parameters are left unchanged; the corresponding value of $G(\theta)$, $G[\phi_1(nL),\phi_2(nL)+\Delta,\theta_1(nL),\theta_2(nL)]$, is computed as in step 1 but in the time interval $(nLT+2LT/5, nLT+3LT/5)$; the estimate of the partial derivative of $G(\theta)$ with respect to $\phi_2$ is computed as:

$$\left.\frac{\partial G(\theta)}{\partial \varphi_2}\right|_{\theta=\theta(nL)} \cong \frac{G[\varphi_1(nL), \varphi_2(nL)+\Delta, \theta_1(nL), \theta_2(nL)] - G[\varphi_1(nL), \varphi_2(nL), \theta_1(nL), \theta_2(nL)]}{\Delta} \quad (17)$$

Step 4. Find the partial derivative:

$$\left.\frac{\partial G(\theta)}{\partial \theta_1}\right|_{\theta=\theta(nL)}$$

at iteration n; to do this, parameter $\theta_1$ is set at $\theta_1(nL)+\Delta$ while the other parameters are left unchanged; the corresponding value of $G(\theta)$, $G[\phi_1(nL),\phi_2(nL),\theta_1(nL)+\Delta,\theta_2(nL)]$, is computed as in Step 1 but in the time interval $(nLT+3LT/5, nLT+4LT/5)$; the estimate of the partial derivative of $G(\theta)$ with respect to $\theta_1$ is computed as:

$$\left.\frac{\partial G(\theta)}{\partial \theta_1}\right|_{\theta=\theta(nL)} \cong \frac{G[\varphi_1(nL), \varphi_2(nL), \theta_1(nL)+\Delta, \theta_2(nL)] - G[\phi_1(nL), \varphi_2(nL), \theta_1(nL), \theta_2(nL)]}{\Delta} \quad (13)$$

Step 5. Find the partial derivative:

$$\left.\frac{\partial G(\theta)}{\partial \theta_2}\right|_{\theta=\theta(nL)}$$

at iteration n; to do this the parameter $\theta_2$ is set at $\theta_2(nL)+\Delta$ while the other parameters are left unchanged; the corresponding value of $G(\theta)$, $G[\phi_1(nL),\phi_2(nL),\theta_1(nL),\theta_2(nL)+\Delta]$, is computed as in Step 1 but in the time interval $(nLT+4LT/5, (n+1)LT)$; the estimate of the partial derivative of $G(\theta)$ with respect to $\theta_2$ is computed as:

$$\left.\frac{\partial G(\theta)}{\partial \theta_2}\right|_{\theta=\theta(nL)} \cong \frac{G[\varphi_1(nL), \varphi_2(nL), \theta_1(nL), \theta_2(nL)+\Delta] - G[\varphi_1(nL), \varphi_2(nL), \theta_1(nL), \theta_2(nL)]}{\Delta}. \quad (14)$$

2. Method in accordance with claim 1 in which said optical devices comprise a polarization controller with control angles $\phi_1$, $\phi_2$ and two optical rotators with rotation angles $\theta_1$ and $\theta_2$ and said parameters comprise said control angles $\phi_1$, $\phi_2$ and said rotation angles $\theta_1$, $\theta_2$ or functions thereof.

3. Method in accordance with claim 2 in which between the controller and an optical rotator and between optical rotators there are fibers which introduce a predetermined differential unit delay maintaining the polarization.

4. Compensator for PMD in optical fiber communication systems, configured for applying the method in accordance with claim 1 and comprising a cascade of adjustable optical devices over which passes an optical signal to be compensated and an adjustment system comprising a photodetector which takes the components $y_1(t)$ and $y_2(t)$ on the two orthogonal polarizations from the signal at the compensator output, a sampler which samples at instants $t_k = kT$ with $T$=symbol interval, the signal $y(t)=|y_1(t)|^2+|y_2(t)|^2$ at the output of the photodetector to obtain samples $y(t_k)$, a circuit for computation of the mean square error $e(k)=y(t_k)-u(k)$ with $u(k)$ equal to the symbol transmitted and a regulator which regulates parameters of at least some of said optical devices to tend towards minimization of $e(k)$.

5. Compensator in accordance with claim 4 characterized in that said optical devices comprise a polarization controller with control angles $\phi_1$, $\phi_2$ and two optical rotators with rotation angles $\theta_1$ and $\theta_2$ and in which said parameters which are adjusted consist of said control angles $\phi_1$, $\phi_2$ and said rotation angles $\theta_1$ and $\theta_2$.

6. Compensator in accordance with claim 5 characterized in that between the controller and optical rotator and between optical rotators there are fibers which introduce a predetermined differential unit delay maintaining the polarization.

7. Method for the adaptive adjustment of a PMD compensator in optical fiber communication systems with the compensator comprising a cascade of adjustable optical devices over which passes an optical signal to be compensated comprising the steps of:
  a. extracting the $y_1(t)$ and $y_2(t)$ on the two orthogonal polarizations of the signal at the compensator output,
  b. obtaining the signal $y(t)=|y_1(t)|^2+|y_2(t)|^2$;
  c. sampling the signal $y(t)$ at instants $t_k=kT$ with $T$=symbol interval to obtain samples $y(t_k)$,
  d. computing the mean square error $e(k)=y(t_k)-u(k)$ with $u(k)$ equal to the symbol transmitted or with $u(k)$ replaced by a decision $\hat{u}(k)$ on the transmitted symbol $u(k)$, and
  e. producing control signals for parameters of at least some of said adjustable optical devices to tend toward minimization of $e(k)$,
  in which the PMD compensator is modeled as a two-dimensional transverse filter using four tapped delay lines (TDL) combining the signals on the two principal polarization states (PSP),
  in which said parameters being consolidated in a vector $\theta$ and a function $F(\theta)=e(k)$ being defined the parameters are adjusted to tend to minimize the mean value of $F^2(\theta)$,
  in which the vector $\theta$ of said parameters is updated by adding a new vector with the norm proportionate to the norm of the gradient of $F^2(\theta)$ and with opposite direction, all its components have their sign changed so that the updating rule is:

$$\theta[(n+1)L]=\theta(nL)-4\gamma\hat{e}(nL)\mathrm{Re}\{J^H A(nL)c\}, \quad (26)$$

with the Hermitian matrix $A(k)$ given by:

$$A(k)=a(k)^*a^T(k)+b(k)^*b^T(k), \quad (24)$$

with the vectors $a(k)$ and $b(k)$ given by:

$$a(k) = \begin{pmatrix} x_1(t_k) \\ x_1(t_k - \alpha\tau_c) \\ x_1(t_k - \tau_c) \\ x_1(t_k - \tau_c - \alpha\tau_c) \\ x_2(t_k) \\ x_2(t_k - \alpha\tau_c) \\ x_2(t_k - \tau_c) \\ x_2(t_k - \tau_c - \alpha\tau_c) \end{pmatrix} \quad b(t) = \begin{pmatrix} x_2^*(t_k - 2\tau_c) \\ x_2^*(t_k - \tau_c - \beta\tau_c) \\ x_2^*(t_k - \tau_c) \\ x_2^*(t_k - \beta\tau_c) \\ -x_1^*(t_k - 2\tau_c) \\ -x_1^*(t_k - \tau_c - \beta\tau_c) \\ -x_1^*(t_k - \tau_c) \\ -x_1^*(t_k - \beta\tau_c) \end{pmatrix} \quad (25)$$

and $$J \triangleq \begin{pmatrix} \frac{\partial c_1}{\partial \varphi_1} & \frac{\partial c_1}{\partial \varphi_2} & \frac{\partial c_1}{\partial \theta_1} & \frac{\partial c_1}{\partial \theta_2} \\ \frac{\partial c_2}{\partial \varphi_1} & \frac{\partial c_2}{\partial \varphi_2} & \frac{\partial c_2}{\partial \theta_1} & \frac{\partial c_2}{\partial \theta_2} \\ \vdots & \vdots & \vdots & \vdots \\ \frac{\partial c_8}{\partial \varphi_1} & \frac{\partial c_8}{\partial \varphi_2} & \frac{\partial c_8}{\partial \theta_1} & \frac{\partial c_8}{\partial \theta_2} \end{pmatrix}, \quad (27)$$

with $c_1, \ldots, c_8$ which are the tap coefficients of the four tapped delay lines and $x_1(t), x_2(t)$ are the components of the two principal polarization states at the compensator input.

8. Method in accordance with claim 7 in which said optical devices comprise a polarization controller with control angles $\phi_1$, $\phi_2$ and two optical rotators with rotation angles $\theta_1$ and $\theta_2$ and said parameters comprise said control angles $\phi_1$, $\phi_2$ and said rotation angles $\theta_1$, $\theta_2$ or functions thereof.

9. Method in accordance with claim 8 in which between the controller and an optical rotator and between optical rotators there are fibers which introduce a predetermined differential unit delay maintaining the polarization.

10. Compensator for PMD in optical fiber communication systems, configured for applying the method in accordance with claim 7 and comprising a cascade of adjustable optical devices over which passes an optical signal to be compensated and an adjustment system comprising a photodetector which takes the components $y_1(t)$ and $y_2(t)$ on the two orthogonal polarizations from the signal at the compensator output, a sampler which samples at instants $t_k=kT$ with $T$=symbol interval, the signal $y(t)=|y_1(t)|^2+|y_2(t)|^2$ at the output of the photodetector to obtain samples $y(t_k)$, a circuit for computation of the mean square error $e(k)=y(t_k)-u(k)$ with $u(k)$ equal to the symbol transmitted and a regulator which regulates parameters of at least some of said optical devices to tend towards minimization of $e(k)$.

11. Compensator in accordance with claim 10 characterized in that said optical devices comprise a polarization controller with control angles $\phi_1$, $\phi_2$ and two optical rotators with rotation angles $\theta_1$ and $\theta_2$ and in which said parameters which are adjusted consist of said control angles $\phi_1$, $\phi_2$ and said rotation angles $\theta_1$ and $\theta_2$.

12. Compensator in accordance with claim 11 characterized in that between the controller and optical rotator and between optical rotators there are fibers which introduce a predetermined differential unit delay maintaining the polarization.

* * * * *

UNITED STATES PATENT AND TRADEMARK OFFICE
CERTIFICATE OF CORRECTION

PATENT NO. : 7,444,082 B2
APPLICATION NO. : 10/498616
DATED : October 28, 2008
INVENTOR(S) : Colavolpe et al.

It is certified that error appears in the above-identified patent and that said Letters Patent is hereby corrected as shown below:

On the Title Page, item (57), under "ABSTRACT", in Column 2, Line 15, delete "y(t)=[y$^1$" and insert -- y(t)=[y$_1$ --, therefor.

In Column 4, Line 25, delete " $\phi_2[(n+1)L] = \phi_2(nL) - \gamma \frac{\partial E\{F^2(\theta)\}}{\blacksquare}\bigg|_{\theta=\theta(nL)}$ " and insert -- $\phi_2[(n+1)L] = \phi_2(nL) - \gamma \frac{\partial E\{F^2(\theta)\}}{\partial \phi_2}\bigg|_{\theta=\theta(nL)}$ --, therefor.

In Column 5, Line 36, delete "$\Phi_1(nL)$," and insert -- $\theta_1(nL)$, --, therefor.

In Column 5, Line 56, delete "$G[\theta_1(nL)+\Delta$," and insert -- $G[\Phi_1(nL)+\Delta$, --, therefor.

In Column 5, Line 58, delete "nLT+2LT/5." and insert -- nLT+2LT/5). --, therefor.

In Column 6, Line 32, delete "$\Phi_1(nL)+\Delta, \Phi_2(nL)]$," and insert -- $\theta_1(nL)+\Delta, \theta_2(nL)]$, --, therefor.

In Column 6, Lines 38-40, in Equation (18), delete " $\frac{\partial G(\theta)}{\partial \blacksquare}\bigg|_{\theta=\theta(nL)}$ " and insert -- $\frac{\partial G(\theta)}{\partial \theta_1}\bigg|_{\theta=\theta(nL)}$ --, therefor.

In Column 6, Lines 59-60, in Equation (19) delete " $\frac{\partial G(\theta)}{\partial \blacksquare}\bigg|_{\theta=\theta(nL)}$ " and insert -- $\frac{\partial G(\theta)}{\partial \theta_2}\bigg|_{\theta=\theta(nL)}$ --, therefor.

UNITED STATES PATENT AND TRADEMARK OFFICE
CERTIFICATE OF CORRECTION

PATENT NO. : 7,444,082 B2
APPLICATION NO. : 10/498616
DATED : October 28, 2008
INVENTOR(S) : Colavolpe et al.

It is certified that error appears in the above-identified patent and that said Letters Patent is hereby corrected as shown below:

In Column 8, Line 48, delete "ci" and insert -- $c_i$ --, therefor.

Signed and Sealed this

Thirty-first Day of March, 2009

JOHN DOLL
*Acting Director of the United States Patent and Trademark Office*